US010661291B2

(12) United States Patent
Schmid

(10) Patent No.: US 10,661,291 B2
(45) Date of Patent: May 26, 2020

(54) DISPENSER FOR DISCHARGING LIQUIDS, AND OPERATING METHOD THEREFOR

(71) Applicant: Felix Schmid, Öhningen (DE)

(72) Inventor: Felix Schmid, Öhningen (DE)

(73) Assignee: APTAR RADOLFZELL GMBH, Radolfzell (DE)

( * ) Notice: Subject to any disclaimer, the term of this patent is extended or adjusted under 35 U.S.C. 154(b) by 0 days.

(21) Appl. No.: 16/290,432

(22) Filed: Mar. 1, 2019

(65) Prior Publication Data

US 2019/0275541 A1 Sep. 12, 2019

(30) Foreign Application Priority Data

Mar. 9, 2018 (EP) ..................................... 18161056

(51) Int. Cl.
*B05B 11/00* (2006.01)
*B65D 83/54* (2006.01)
*G01F 11/02* (2006.01)

(52) U.S. Cl.
CPC .......... *B05B 11/3001* (2013.01); *B65D 83/54* (2013.01); *B65D 83/546* (2013.01); *G01F 11/025* (2013.01)

(58) Field of Classification Search
CPC ............... B05B 11/3001; B05B 11/309; B05B 11/3042; B05B 12/085; B65D 83/54; B65D 83/546

(Continued)

(56) References Cited

U.S. PATENT DOCUMENTS 3,052,382 A * 9/1962 Gawthrop .............. B65D 83/54
222/335
3,858,771 A 1/1975 Bret et al.
(Continued)

FOREIGN PATENT DOCUMENTS

DE 29 20 497 A1 11/1980
EP 0 109 361 A1 5/1984
(Continued)

OTHER PUBLICATIONS

Office Action of European Patent Office issued in European Application No. 18 161 056.9 with English translation of category of cited documents dated Sep. 17, 2018 (9 pages).

*Primary Examiner* — Lien M Ngo
(74) *Attorney, Agent, or Firm* — Flynn Thiel, P.C.

(57) ABSTRACT

Dispenser with a reservoir for storing liquid, and a discharge opening through which the liquid can be dispensed. The dispenser includes a metering device for discharging a defined liquid quantity upon actuation of the dispenser. The metering device at the entry side is connected to the reservoir and at the exit side is connected to the discharge opening. The metering device includes a pre-metering chamber which via an infeed duct is connected to the reservoir, and a main metering chamber which via an intermediate duct is connected to the pre-metering chamber, and via a discharge duct is connected to the discharge opening. The pre-metering chamber and the main metering chamber each have one repositionable wall, the respective chamber volume being variable by repositioning the wall. The walls are operatively coupled such that a volumetric enlargement of the pre-metering chamber causes a volumetric reduction of the main metering chamber.

24 Claims, 15 Drawing Sheets

(58) Field of Classification Search
USPC .................. 222/401, 402, 402.1–402.25
See application file for complete search history.

(56) References Cited

U.S. PATENT DOCUMENTS

| | | |
|---|---|---|
| 4,433,797 A | 2/1984 | Galia |
| 4,650,094 A | 3/1987 | Werding |
| 4,809,888 A | 3/1989 | Suck et al. |
| 5,632,421 A * | 5/1997 | Colombo ............... B65D 83/38 222/402.2 |
| 6,273,304 B1 * | 8/2001 | Hoshino ............... B65D 83/207 222/402.2 |
| 7,445,136 B2 * | 11/2008 | Lin ........................ F17C 13/04 222/402.1 |
| 9,527,658 B2 | 12/2016 | Martin |
| 10,399,767 B2 | 9/2019 | Plaschkes et al. |
| 2017/0008692 A1 | 1/2017 | Davideit et al. |
| 2017/0021993 A1 | 1/2017 | Martin |
| 2018/0141745 A1 * | 5/2018 | Bodet ..................... B65D 83/54 |

FOREIGN PATENT DOCUMENTS

| | | |
|---|---|---|
| EP | 0 125 970 A1 | 11/1984 |
| EP | 2 253 560 A2 | 11/2010 |
| FR | 1 461 685 | 2/1966 |
| FR | 2 591 331 A1 | 6/1987 |
| WO | WO 2016/198257 A1 | 12/2016 |

* cited by examiner

DISPENSER FOR DISCHARGING LIQUIDS, AND OPERATING METHOD THEREFOR

CROSS-REFERENCE TO RELATED APPLICATIONS

This claims priority from European Application No. 18161056.9, filed Mar. 9, 2018, the disclosure of which is hereby incorporated by reference in its entirety.

FIELD OF APPLICATION AND PRIOR ART

Dispensers for liquids are known from various sectors in the prior art. Such dispensers have a liquid reservoir within which a liquid is stored prior to discharging, and a discharge opening through which the liquid can be dispensed. Generic dispensers furthermore have a metering device which permits an approximately consistent liquid quantity to be discharged at all times by way of an actuation movement.

A liquid in the context of the invention are understood to be liquids having a comparatively low viscosity, similar to that of water, as well as cream-type or gel-type liquids having a comparatively high viscosity.

Generic liquid dispensers as well as liquid dispensers according to the invention can be used for discharging pharmaceutical liquids which according to the intended use are applied in particular to the skin of the user or in eyes, the mouth, or the nose. Said liquid dispensers can also be used for cosmetic liquids which are in particular dispensed on the skin or in the hair of a user. Furthermore, generic dispensers as well as dispensers according to the invention can be provided for the metered discharge of foodstuffs such as, for example, ketchup or mayonnaise. Technical liquids such as lubricants, paints, or other coating materials can also be discharged with generic dispensers and with dispensers according to the invention.

Documents relating to the context of the present invention are, for example, US 2017/0021993 A1, US 2017/0008692 A1, U.S. Pat. No. 9,527,658 B2, WO 2016/198257 A1, EP 0109361 A1, and U.S. Pat. No. 3,858,771 A.

OBJECT AND ACHIEVEMENT

It is an object of the invention to make available a dispenser which in a constructively simple manner permits reproducible metering, wherein said metering is preferably also to be possible at a permanently prevailing liquid pressure in the liquid reservoir.

In order for said object to be achieved, a dispenser and an operating method for a dispenser are proposed according to the invention.

A dispenser according to the invention, in a manner corresponding to generic dispensers, includes a liquid reservoir for storing the liquid prior to discharging, and a discharge opening through which the liquid can be dispensed into an environment. Said dispenser furthermore includes a metering device for discharging a defined liquid quantity as a reaction to an actuation of the dispenser. The metering device is provided between the liquid reservoir and the discharge opening and is configured for discharging identical liquid quantities from the liquid reservoir in a reproducible manner.

To this end, the metering device is designed according to the invention as follows. The metering device includes a pre-metering chamber which by way of an infeed duct is at least temporarily connected to the liquid reservoir, and a main metering chamber which by way of an intermediate duct is at least temporarily connected to the pre-metering chamber and by way of a discharge duct is connected to the discharge opening.

Liquid which previously has been directed from the liquid reservoir into the pre-metering chamber is isolated from the liquid reservoir in the pre-metering chamber, wherein a valve assembly that is utilizable to this end can be provided, as will yet be explained hereunder. The liquid from the pre-metering chamber is conveyed onward through the intermediate duct into the main metering chamber and in the latter in terms of the exchange of liquids is isolated from the pre-metering chamber and the liquid reservoir. A valve assembly can also be provided to this end, said valve assembly yet to be explained hereunder.

The pre-metering chamber and the main metering chamber according to the invention have in each case one repositionable wall, the respective chamber volume being variable by the repositioning of said wall, wherein the repositionable walls of the pre-metering chamber and of the main metering chamber are operatively coupled to one another in such a manner that a volumetric enlargement of the pre-metering chamber causes a volumetric reduction of the main metering chamber.

In the case of a dispenser according to the invention, two chambers, the pre-metering chamber and the main metering chamber, are thus provided between the liquid reservoir and the discharge opening. Said two chambers are at least temporarily connected to one another in such a manner that in a first phase of utilization liquid can flow from the liquid reservoir into the pre-metering chamber, and in a second phase of utilization liquid can flow from the pre-metering chamber into the main metering chamber. As will yet be explained hereunder, the respective control of the phases can be performed by way of valves which can open and close as a function of pressure and/or by switching an actuation handle.

On account of the operative coupling of the repositionable walls, the volumes of the pre-metering chamber and of the main metering chamber are mutually dependent. When the pre-metering chamber is enlarged by repositioning the repositionable wall thereof, this leads to a reduction of the volume of the main metering chamber. This correlation is utilized according to the invention for being able to discharge liquid from the main metering chamber through the discharge opening in that in the event of liquid flowing thereinto an enlargement of the pre-metering chamber takes place, and a reduction in size of the main metering chamber and thus a discharge take place.

The infeed duct which connects the liquid reservoir to the pre-metering chamber, and the intermediate duct which connects the pre-metering chamber to the main metering chamber, can in portions be embodied so as to be conjoint.

A dispenser according to the invention is usually configured as a portable dispenser and therefore preferably includes a liquid reservoir having a maximum liquid volume of up to 1000 ml, preferably of up to 500 ml, particular preferably of up to 250 ml.

The fields of application for a dispenser according to the invention are diverse. The use in the pharmaceutical and cosmetic sector is seen as particularly advantageous. In the pharmaceutical sector, this is preferably a dispenser for discharging liquid on the skin of the user or in the eyes, the nose or the mouth of said user, such that the dispenser to this end can be provided with a correspondingly adapted applicator and be filled with the pharmaceutical liquid. In the cosmetic sector a dispenser according to the invention is in particular capable of being expediently used for the discharge of gels and lotions on the skin and in this case is preferably filled with a cosmetic liquid, in particular a cosmetically active gel or a cosmetically active lotion.

Besides the pharmaceutical or cosmetic use, the use for foodstuffs and a corresponding filling of the liquid reservoir with ketchup, mayonnaise, edible oil, sauces or dressings is also proposed according to the invention. In the sector of technical liquids, the use with paints and other coating materials as well as oils and a corresponding filling of the liquid reservoir are in particular proposed.

The liquid quantity to be metered in each case by means of the metering device naturally depends significantly on the field of application. The liquid quantity of the metering device to be metered, which depending on the construction mode is a function of the repositioning capability of the repositionable wall of the main metering chamber, depending on the application, is preferably between 0.01 ml and 5 ml. A discharge volume between 0.1 ml and 3 ml, in particular between 1 ml and 2 ml, is considered expedient for many applications.

A spring device by way of which the operatively coupled repositionable walls of the pre-metering chamber and of the main metering chamber are permanently impinged with a force in the effective direction of a volumetric reduction of the pre-metering chamber and a volumetric enlargement of the main metering chamber is preferably provided.

The spring device mentioned serves as a restoring means. A repositioning of the repositionable walls of the metering chambers to the effect that the main metering chamber is reduced in size and the pre-metering chamber is enlarged is performed in the manner described in that liquid flows into the pre-metering chamber and under the liquid pressure prevailing in the inflow repositions the repositionable walls. The spring device described serves as a restoring means so as to reposition the walls of the metering chambers in such a manner that the pre-metering chamber is volumetrically reduced and the main metering chamber is volumetrically enlarged. The spring device herein should be adapted to the conveying pressure when filling the pre-metering chamber in such a manner that said spring device can be compressed by said conveying pressure and thus not counter an enlargement of the pre-metering chamber.

The spring device, in the case of a filled pre-metering chamber after the isolation of the pre-metering chamber from the liquid reservoir, serves particularly preferably for the purpose of pumping the liquid out of the pre-metering chamber and into the main metering chamber. Said spring device thus particularly preferably acts in a dual manner, so to speak. Said spring device in the case of a design of the discharge opening having a discharge valve, on account of the enlargement of the main metering chamber achieves a negative pressure, and in the pre-metering chamber achieves a positive pressure such that the liquid can flow through the intermediate duct from the pre-metering chamber into the main metering chamber.

An intermediate valve which in the closed state prevents and in the opened state enables the inflow of liquid from the pre-metering chamber into the main metering chamber is preferably provided in the intermediate duct.

The intermediate valve in the opened state serves the purpose of permitting a recirculation of the liquid from the pre-metering chamber into the main metering chamber, but when filling the pre-metering chamber and/or during discharging, preventing that liquid from the liquid reservoir from flowing directly into the main metering chamber while bypassing the pre-metering chamber, or being dispensed from the main metering chamber not in the direction of the discharge opening but in the direction of the pre-metering chamber, respectively. The valve in the case of a non-actuated actuation handle is preferably opened, and is only closed by actuating the actuation handle.

An infeed valve which in the closed state prevents and in the opened state enables the inflow of liquid from the liquid reservoir into the pre-metering chamber is likewise preferably provided in the infeed duct.

The infeed valve serves the purpose of isolating the pre-metering chamber in relation to the liquid reservoir such that a liquid pressure optionally prevailing in the liquid reservoir in an out-of-use resting state of the dispenser cannot act on the liquid in the pre-metering chamber and the main metering chamber, on the one hand. This isolation in relation to the liquid reservoir is advantageous, on the other hand, so as to be able to convey liquid from the pre-metering chamber into the main metering chamber without said liquid flowing back into the liquid reservoir.

The infeed valve is preferably spring-loaded and is particularly preferably by way of an integral spring device provided to this end is permanently pushed in the direction of the closed state of said infeed valve. An actuation force acting counter to said spring device is thus required so as to open said infeed valve.

The dispenser preferably includes an actuation handle which for controlling the infeed valve and/or the intermediate valve is operatively connected to at least one of said valves. The actuation handle preferably acts mechanically on the infeed valve or the intermediate valve, respectively, such that the control of the respective valve is enabled irrespectively of a liquid pressure prevailing in the dispenser.

The actuation handle particularly preferably acts on the intermediate valve in a direct mechanical manner. The intermediate valve is particularly preferably closed by actuating the actuation handle, thus usually by pressing down the actuation handle. The intermediate valve particularly includes a valve seat and a valve body, wherein one of said two elements can be configured so as to be locationally fixed in relation to the actuation handle. However, a design in which a valve body is movable separately from the actuation handle but by means of the actuation handle can be pushed to a closed position in which said valve body bears on the valve seat and, on account thereof, closes the intermediate duct is preferable.

The actuation handle by being coupled to the infeed valve can control whether liquid is conveyed under pressure from the liquid reservoir into the pre-metering chamber and, on account thereof, the liquid in the main metering chamber is also indirectly impinged with pressure.

A common actuation handle which for controlling the infeed valve and the intermediate valve is operatively connected to both valves is preferably provided on the dispenser, such that both valves by means of only one actuation handle can be opened or closed, respectively, in different phases of the utilization of the dispenser. Alternatively, a mechanical coupling of said valves in which said valves in mechanical terms are not switched by an actuation handle but as a reaction to another status change, for example as a reaction to a rising pressure in the liquid reservoir, can also be provided.

In the case of one preferred design it is provided that the operative connections between the common actuation handle, on the one hand, and the infeed valve and the intermediate valve, on the other hand, are specified in such a manner that the intermediate valve is closed and the infeed valve is opened by actuating the common actuation handle.

According to this refinement, the actuation handle is thus configured for establishing a second state of the metering device in which the intermediate valve is closed and the infeed valve is opened from an initial state in which the infeed valve is closed and the intermediate valve is opened. In this second state, liquid under pressure from the liquid reservoir can reach the pre-metering chamber, but on account of the intermediate valve is deterred from flowing directly into the main metering chamber and/or to the discharge opening.

The operative connection between the common actuation handle or another triggering state, such as a pressure increase in the liquid reservoir, on the one hand, and the infeed valve and the intermediate valve, on the other hand, is preferably specified in such a manner that the intermediate valve is initially closed by actuating the common actuation handle, and the infeed valve is opened by the subsequent, in particular by the continuing, actuation of the common actuation handle.

The operative connection mentioned is thus configured for causing a type of delay. The intermediate valve is thus already closed when the infeed valve is opened. A possibility to this end lies in that both valves, the infeed valve and the intermediate valve, are opened or closed, respectively, in different actuated positions of the actuation handle. A design in which, in constructive terms, a causality which renders opening the infeed valve in the event of an opened intermediate valve impossible is achieved is particularly advantageous. This is achievable, for example, in that the force flux between the actuation handle and the infeed valve runs through the intermediate valve in such a manner that the latter can achieve the respective force flux only when the valve body of said intermediate valve bears on the valve seat of the intermediate valve and thus when the intermediate valve is closed.

A possibility for achieving such a sequence provides that the intermediate valve has a valve seat and a valve body that is movable in relation thereto, wherein for controlling said valve body by means of the common actuation handle a first control portion which is fixedly connected to the common actuation handle and which when actuating the actuation handle presses the valve body against the valve seat is provided, wherein the valve body can be configured so as to be separate from the first control portion or else can be provided so as to be locationally fixed in relation to said first control portion or else be provided so as to be integral to said first control portion.

Additionally, a second control portion for actuating the infeed valve can be provided, wherein said second control portion is preferably disposed so as to be locationally fixed in relation to the valve seat of the intermediate valve such that, after the closing of the intermediate valve, the second control portion for opening the infeed valve is repositionable by way of the common actuation handle.

In the case of one preferred design of a dispenser according to the invention it is provided that an outlet valve which by positive pressure in the main metering chamber can be kept in a closed state is provided between the main metering chamber and the discharge opening. Said outlet valve can be forcibly opened by actuating the dispenser.

Such a design permits liquid to be stored under pressure in the main metering chamber, since said pressure autonomously causes the outlet valve to be kept closed prior to the actuation of the dispenser. The pressurization of the liquid does not primarily serve for the subsequent discharge, since the pressure required therefor is preferably generated on account of the enlargement of the pre-metering chamber when actuating the dispenser. The primary advantage of such a design which permits the pressurized intermediate storage of liquid in the main metering chamber lies in that, on account thereof, liquids which require pressurized storage can also be discharged. Said liquids include in particular liquids for forming foam. Said liquids must only be relaxed when actually being discharged.

The outlet valve mentioned is distinguished in that said outlet valve cannot be opened by way of liquid pressure in the main chamber, but is rather pushed into the closed state. Opening requires the actuation of the dispenser, in particular the pushing down of the actuation handle. The outlet valve mentioned is forcibly opened on account thereof, in particular in that a portion conjointly moved with the actuation handle comes into physical contact with a valve body of the outlet valve and pushes the latter away from the valve seat thereof.

A design in which the valve body of the outlet valve is identical to the valve body of the intermediate valve, thus forms a common valve body is particularly advantageous in terms of construction. Said common valve body is movable between two terminal positions, wherein each of the terminal positions is assigned one valve seat. When the valve body is in the one terminal position, said valve body thus closes the outlet valve. When the valve body is in the opposite second terminal position, the valve body thus closes the inlet valve.

In the simplest case, the repositionable walls of the pre-metering chamber and of the main metering chamber are formed by a deformable membrane, the one side of said membrane the limiting the pre-metering chamber, and the other side of said membrane delimiting the main metering chamber.

However, the repositionable walls of the pre-metering chamber and of the main metering chamber are preferably displaceable walls which are substantially rigid. Said walls can be connected by means of a gearbox, such that the movement of one of the walls is possible only in the case of a simultaneous movement of the other wall.

The two walls here can in particular be configured so as to be mutually locationally fixed and formed by a common wall unit which in the manner of a piston is configured so as to be displaceable. This construction mode is particularly simple. Both repositionable walls are made available by only one component. However, alternative construction modes provide that the walls are provided on separate components and in an operatively connected manner are repositioned to a variable extent, for example by way of the intervening gearbox mentioned. Such a gearbox is an expedient potential implementation in particular when it is desirable for the pressurization of the liquid in the main metering chamber to be performed at another pressure than that in the liquid reservoir and in the pre-metering chamber.

However, by virtue of the simple construction mode it is preferred that an at least substantially identical pressure in the pre-metering chamber and the main metering chamber is achieved by a common wall unit.

It is particularly preferable herein when the repositionable walls of the pre-metering chamber and of the main metering chamber are of identical size in relation to the movement direction, such that a volumetric reduction of the pre-metering chamber by repositioning the wall unit to the same extent causes a volumetric enlargement of the main metering chamber. On account of the identical size, the liquid pressure in the case of a closed intermediate valve is substantially identical on both sides, thus in the pre-metering chamber and the main metering chamber. Only the spring device already mentioned may lead to the liquid pressure prevailing in the main metering chamber being somewhat lower than the pressure in the pre-metering chamber.

Alternatively, however, designs in which the repositionable walls are of dissimilar size can also be provided, this leading to a particular characteristic when transferring liquid from the pre-metering chamber into the main metering chamber, as is yet to be explained hereunder.

The repositionable wall of the pre-metering chamber can thus be larger or smaller than the repositionable wall of the main metering chamber, such that a volumetric reduction of the pre-metering chamber by repositioning the wall unit to a smaller or larger extent causes a volumetric enlargement of the main metering chamber.

Dissimilar sizes of the repositionable walls in this context refer to the area portions of the respective repositionable wall that are effective in terms of the generation of pressure. Different effects which may be desirable in specific cases can be achieved by the dissimilar size. A particular pressurization effect in which the pressure in the main metering chamber may be significantly higher or lower than that in the pre-metering chamber can thus in particular be achieved. By way of the latter, a particularly pressure-free discharge of liquid, or a spray pattern that is generated by a particularly high pressure, can be produced, for example. Furthermore, a reverse suction of liquid from the discharge duct into the main metering chamber can as a result be effected in that the volumetric increase in the main metering chamber in the repositioning of the repositionable walls is larger than the volumetric reduction in the pre-metering chamber.

The described design according to the invention provides that liquid is conveyed under pressure from the liquid reservoir into the pre-metering chamber and the volume of the metering chamber, on account thereof, is reduced and a discharge of liquid is caused by the interacting walls.

In order for the pressure for filling the pre-metering chamber and for reducing the volume of the main metering chamber to be generated, the dispenser as liquid reservoir preferably includes a pressure reservoir which is configured for storing liquids at a positive pressure.

Such a pressure reservoir leads to the liquid being permanently under pressure in the liquid reservoir and already in the shipping state to the final customer. This is possible, for example, by a permanently tensioned spring device in the pressure reservoir which acts on a pressurization piston. Other designs provide the presence of propellant gas in the liquid reservoir. Designs having a liquid bag within the pressure reservoir are also possible, said liquid bag being surrounded by a gas atmosphere that is under a positive pressure.

Alternatively, other designs are possible in which the dispenser includes a pressurization device by means of which liquid from the liquid reservoir for the purpose of feeding into the pre-metering chamber is able to be pressurized in a case-to-case manner.

Such a design could, for example, comprise a pump device by means of which a liquid reservoir not provided for long-term pressurization is pressurized in a preparatory manner for subsequent discharging.

In principle, the coupling of a pump device for conveying liquid from the liquid reservoir into the pre-metering chamber to the already mentioned actuation handle is also possible. Said coupling could thus initially effect the pressurization of liquid from the liquid reservoir and subsequently optionally act on the intermediate valve, or the infeed valve and the intermediate valve. A design in which the pressurization of the liquid reservoir is manually performed, for example in the manner of a tube, and in which the controlling of the mentioned valves, thus of the intermediate valve and the infeed valve, is optionally performed indirectly by said pressurization of the liquid reservoir is also conceivable.

The dispenser preferably includes a modular construction mode having a storage unit and a discharge head coupled thereto. The storage unit herein comprises the liquid reservoir as well as an outlet for discharging the liquid in the direction of the discharge head. The discharge head unifies therein the pre-metering chamber, the main metering chamber, and the discharge opening.

In the case of a design having an infeed valve in the infeed duct between the liquid reservoir and the pre-metering chamber, said infeed valve is preferably part of the storage unit.

Storage units of this type which comprise a pressure reservoir and a valve are well known, for example from the field of deodorants. The discharge head having the metering device of the type according to the invention could thus be coupled to a commercially available pressure reservoir having such a valve, and on account thereof add a metering device to said commercially available pressure reservoir. The valve on the pressure reservoir in this instance forms the infeed valve in the context described above.

In the case of one particular advantageous design, the discharge head is subdivided into an adapter unit and a discharge unit. The adapter unit has the fastening device for fastening to the storage unit. The discharge unit has the discharge opening. The adapter unit and the discharge unit are plug-fitted in a simple manner, wherein the discharge duct from the main metering chamber to the discharge opening is also created. In particular, a purely force-fitting plug connection can be provided between the adapter unit and the discharge unit, but designs having a form-fitting plug connection, which can be implemented, for example, by way of latching cams on the adapter unit or the discharge unit, are also possible.

A high level of variability is guaranteed in the case of such a design having an adapter unit and a discharge unit. The discharge unit with or without the adapter unit is preferably capable of being connected to the storage unit such that an adaptation to specific requirements can be performed at the manufacturer or at the customer. The discharge unit is connected to the adapter unit by way of a simple connection which is possible without any further disassembly of the discharge unit or the adapter unit. This can in particular be a purely force-fitting plug connection such as is already commonplace in the case of discharge heads for pressure reservoirs. A design having a latching connection which is achievable by plug-fitting the adapter unit can also be advantageous.

The storage unit preferably has a cover, in particular a metallic cover which closes the liquid reservoir in the direction of the discharge head. Said cover is penetrated by the infeed duct and includes a depressed region. The pre-metering chamber and/or the main metering chamber can be delimited by an external wall that surrounds the respective chamber of the external side and by an end wall, wherein the external wall and the end wall are formed by two different parts which are connected to one another in a latching manner. In such a case, it is advantageous when the external wall and/or a securing element that is disposed on the external side of the external wall protrude into the depressed region of the cover such that a mutual mechanical separation of the external wall and of the end wall under the effect of the pressure in the pre-metering chamber or the main metering chamber, respectively, is precluded by way of an encircling securing wall of the cover.

The mentioned cover of the storage unit in a similar manner is already known from known storage units. This is usually a metallic cover which is fastened to the substantially cylindrical shell wall of the pressure reservoir by way of a crimp connection. The design proposed therefor provides that the depression created by said cover is utilized for preventing in a form-fitting manner that the mentioned external wall and the mentioned end wall separate from one another. The risk of such a separation is provided by the high-pressure at which the liquid from the liquid reservoir flows into the pre-metering chamber, said pressure depending on the design embodiment.

Designs in which no further elements whatsoever are present between the securing wall of the cover and the external wall of the pre-metering chamber or the main metering chamber are possible. However, an intervening securing element can also be provided. This is expedient in particular when the external wall and the end wall according to the intended use are axially repositioned in the actuation of the dispenser, as is yet to be explained hereunder. The intervening securing element can guarantee in such a case that a joint between the external wall and the end wall is secured even when the joint has been moved axially out of the depression of the cover.

One advantageous design provides that the pre-metering chamber and/or the main metering chamber are/is delimited by two common chamber components which are connected to one another in an axial direction and which are preferably provided so as to be locationally fixed in relation to the second control portion.

Besides the design described above while utilizing the cover as a safeguard, a design in which the chamber components comprise in each case one cylindrical external portion, wherein the two external portions are push-fitted into one another in an overlapping manner has been demonstrated so as to be advantageous in constructive terms. A particularly high level of stability is achieved on account thereof. The overlapping regions of preferably a few millimeters of overlapping length are moreover very suitable for the disposal of latching elements for latching the chamber components.

It is furthermore advantageous when a basic housing of the discharge head surrounds one of the external portions mentioned in such a manner that a widening of the external portion is delimited so as to counteract any separation of the chamber components. The complete separation of the chamber components can thus be prevented. A leakage is indeed possible, but a potentially complete separation of the chamber components that could cause injury is effectively prevented.

The construction of a dispenser according to the invention preferably provides that the discharge head includes a basic housing which by way of the fastening device is connected to the liquid reservoir in a locationally fixed manner. The discharge head preferably includes an actuation unit which is movable in a linear manner in relation to the basic housing mentioned and which comprises the actuation handle, as well as a chamber unit which is movable in a linear manner in relation to the basic housing and the actuation unit and which forms the external wall of the pre-metering chamber and/or of the main metering chamber.

The basic housing mentioned at all times remains locationally fixed in relation to the liquid reservoir, or to a housing of the liquid reservoir, respectively. By contrast, the actuation handle is repositionable so as to enable opening and closing of the intermediate valve and to furthermore be able to open or close the infeed valve.

The repositionable design embodiment of the chamber unit is not mandatory but advantageous. Said repositionable design embodiment permits the chamber unit, or an actuation portion that is locationally fixed in relation thereto, respectively, to be directly utilized for opening or closing, respectively, the infeed valve. This has the advantage that no sliding seals whatsoever have to be provided in the region of the pre-metering chamber between the liquid reservoir and the pre-metering chamber, this being advantageous in particular because high pressures prevail here and it has been demonstrated that sliding seals at this location are implementable so as to be sufficiently safe only in a complex manner.

Nevertheless, in the case of an alternative design it can be provided that the chamber unit is provided so as to be locationally fixed in relation to the basic housing. However, in the case of such a design in which the actuation handle is to switch the intermediate valve and the infeed valve it is necessary for the respective actuation portion for switching the infeed valve is repositionable in relation to the chamber unit, this being associated with the problem described of the sliding seal required there in this instance. However, this design embodiment can also be expedient when the complexity required therefor appears to be appropriate, or by virtue of only low operating pressures of the dispenser according to the invention is unproblematic.

The dispenser in the case of one potential design embodiment has a discharge valve in the discharge duct, said discharge valve opening as a function of the pressure of the liquid flowing in from the main metering chamber.

The discharge valve is preferably a valve that switches in a pressure-dependent manner and which opens in the case of sufficient pressure in the main metering chamber and thus in a discharge duct that leads to the discharge opening. On account thereof, a specifically adapted discharge characteristic, for example a specific spray pattern, can be achieved. Moreover, such a valve is expedient for isolating the liquid remaining in the discharge duct in relation to an environment and thus for preventing contaminations. The valve, for the purpose of recirculating liquid from the pre-metering chamber into the main-metering chamber, is furthermore also advantageous for effecting the creation of an negative pressure advantageous therefor in the main-metering chamber. On account of the discharge valve mentioned it is prevented that said negative pressure is suppressed by air flowing from an environment through the discharge opening.

Besides the dispenser per se, the invention also relates to an operating, method for such a dispenser. The following steps are provided in the case of this method. The pre-metering chamber by way of the infeed duct is first filled with pressurized liquid from the liquid reservoir, wherein said pre-metering chamber on account of the pressure-related repositioning of the repositionable wall of the pre-metering chamber assumes the maximum volume of said pre-metering chamber, and the main metering chamber, on account of the repositioning of the repositionable wall caused thereby, assumes the minimum volume of said main metering chamber. Proceeding from the filled pre-metering chamber, the liquid from the pre-metering chamber while repositioning the repositionable wall is then conveyed through the intermediate duct into the main metering chamber until the main metering chamber assumes the maximum volume thereof and the pre-metering chamber assumes the minimum volume thereof. In the course of a renewed filling of the pre-metering chamber by way of the infeed duct with pressurized liquid from the liquid reservoir, the repositionable walls of the pre-metering chamber and of the main metering chamber are repositioned yet again such that the volume of the main metering chamber is reduced and the liquid from the main metering chamber is discharged through the discharge opening.

BRIEF DESCRIPTION OF THE DRAWINGS

Further advantages and aspects of the invention are derived from the claims and from the description hereunder of preferred exemplary embodiments of the invention which are explained hereunder by means of the figures in which:

DETAILED DESCRIPTION OF THE EXEMPLARY EMBODIMENTS

Figure 1:
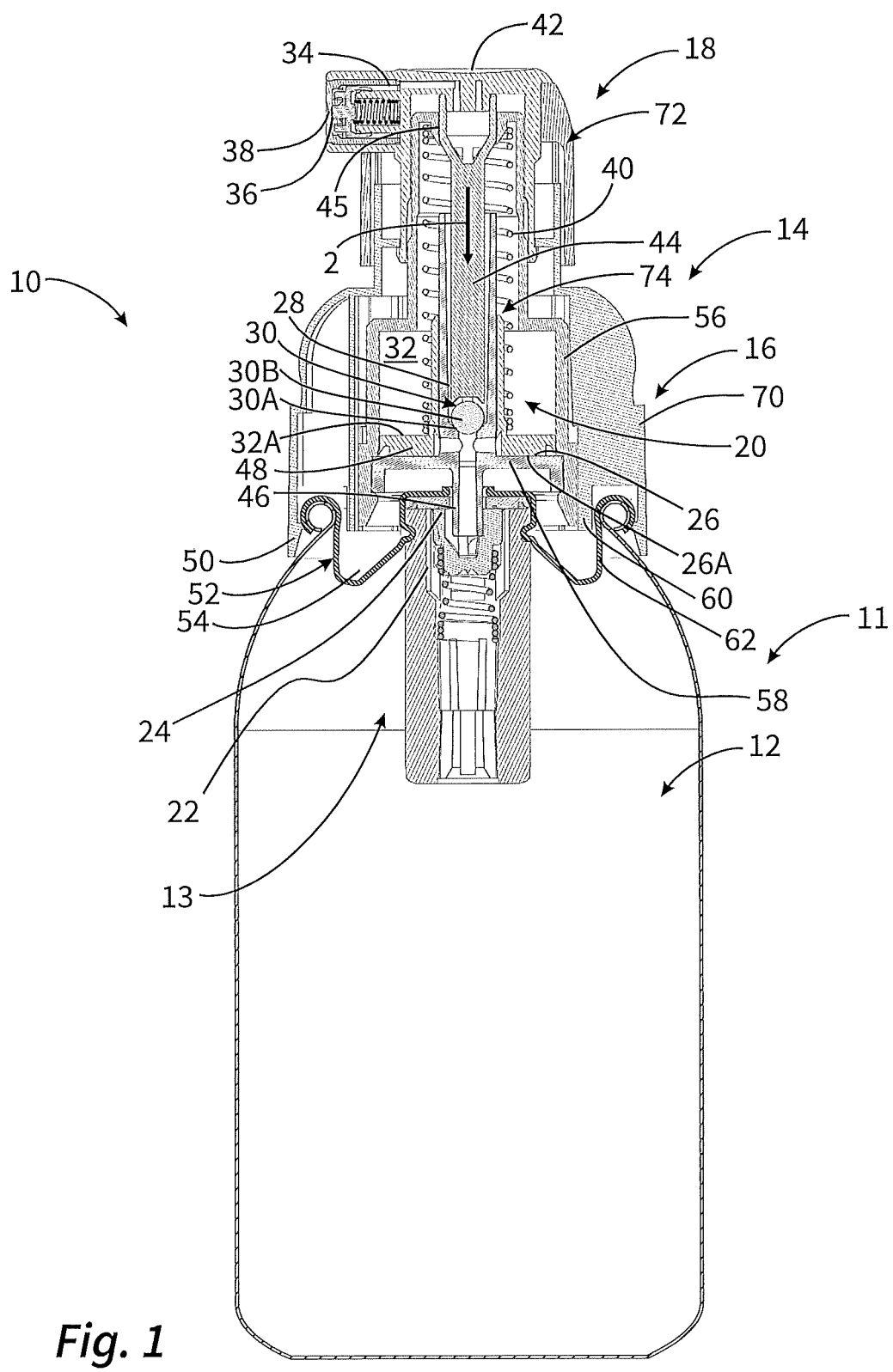
FIG. 1 shows a dispenser according to the invention in an overall illustration in a sectional view.

FIG. 1 shows a liquid dispenser 10 in a sectional overall illustration.

The liquid dispenser 10 includes a storage unit 11 which comprises a liquid reservoir 12 having a discharge valve assembly 13. A discharge head 14 is placed on the storage unit 11 and by means of a fastening device 50 is connected in a latching manner to the storage unit 11. Said discharge head 14 in turn includes an adapter unit 16 and a discharge unit 18. A discharge opening 38 is provided on this discharge unit 18.

The discharge head 14 contains the predominant numbers of components of a metering device 20. Said metering device 20 includes a pre-metering chamber 26, which in the state of FIG. 1 is reduced to the minimum, and a main metering chamber 32. The pre-metering chamber 26 and the main metering chamber 32 are provided in a chamber unit 74 which inter alia makes available an external wall 56 and an end wall 58 as external walls of the chamber unit 74. The pre-metering chamber 26 and the main metering chamber 32 are mutually separated by a wall unit 48 which in relation to the external wall 56 and to the end wall 58 in the vertical direction is repositionable in the manner of a piston and herein permits an enlargement of the pre-metering chamber 26 while reducing in size the main metering chamber 32, as well as a reduction in size of the pre-metering chamber 26 while enlarging the main metering chamber 32. Said wall unit 48 represents a repositionable wall 32A on the main metering chamber 32 and a repositionable wall 26A on the pre-metering chamber 26. The wall unit 48 by way of a spring device 40 which is presently designed in the form of a coil compression spring is impinged with a force in such a manner that said wall unit 48 acts downward and thus in the direction of a volumetric reduction of the pre-metering chamber 26.

The pre-metering chamber 26 is connected to the liquid reservoir 12 by an infeed duct 22 which partially extends within the storage unit 11 and is partially formed by a hollow control portion 46 of the chamber unit 74. An infeed valve 24 which is part of the valve assembly 13 of the storage unit 11 is provided within the said infeed duct 22. The pre-metering chamber 26 and the main metering chamber 32 are connected to one another by an intermediate duct 28, wherein a valve, specifically the intermediate valve 30, is also provided in this intermediate duct 28.

Liquid from the main metering chamber 32 can flow into a discharge duct 34, the discharge opening 38 being provided at the end of said discharge duct 34. A discharge valve 36 in the discharge duct 34 as a function of pressure is opened in the case of a sufficient pressure of the liquid in the discharge duct 34 and in the main metering chamber 32.

The chamber unit 74 already mentioned is movable in a movement direction 2 in relation to the liquid reservoir 12 and to a basic housing 70 of the discharge head, said basic housing 70 by way of the fastening device 50 being coupled in a latching manner to the storage unit 11. An actuation unit 72 is also movable in the movement direction 2 in relation to the basic housing 70 and to the chamber unit 74, said actuation unit 72 comprising, on the one hand, the discharge unit 18 together with the discharge duct 34 and the discharge opening 38, and however additionally comprising a first control portion 44 which extends into the chamber unit 74 and up to the intermediate valve 30 and on the external side in the region of a sliding seal 45 is sealed in relation to the chamber unit 74. An actuation handle 42 in the form of a compression face is provided on the upper side of the discharge head 14.

Since a high pressure is built up in the chamber unit 74 in the subsequently described operation, the chamber unit 74 is secured in relation to the end wall 58 under the effect of pressure being separated from the cylindrical external wall 56. The safeguard is achieved in that the chamber unit 74 extends into the internal region 54 of a metallic cover 52 of the storage unit 11. The wall 62 of the cover 52 that surrounds said region 54, by way of the wall of the basic housing 70 that serves as a securing element, indirectly prevents a radial widening of the external wall 56 that would be required for a separation from the end wall 58.

Proceeding from the dispenser 10 in the supplied state of FIG. 1, the putting into operation will be explained by means of FIGS. 2A to 2I.

Figure 2A:
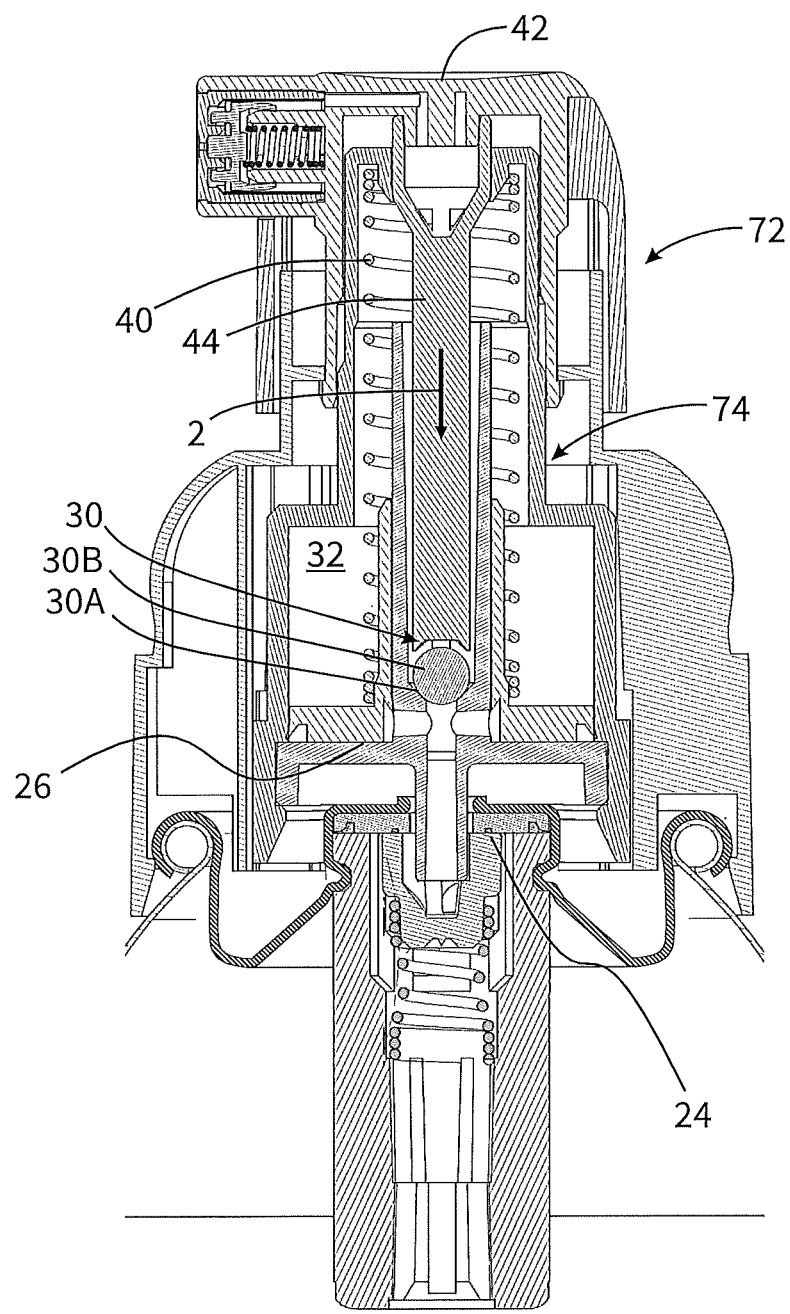
FIGS. 2A to 2H show a part-region of the dispenser including the upper part of the storage unit thereof as well as the discharge head thereof, wherein various operational stages of the dispenser are highlighted.

FIG. 2A shows the state corresponding to FIG. 1. The actuation handle 42 is illustrated in an upper terminal position which simultaneously represents the initial position. The intermediate valve 30 is opened, since a spherical valve body 30B can be freely released from the valve seat 30A, and the main metering chamber 32 is thus connected to the pre-metering chamber 26. The infeed valve 24, under the compression of a valve spring of the storage unit 11, is closed. The pre-metering chamber 26 in this state has the minimum volume thereof. The main metering chamber 32 has the maximum volume thereof.

Figure 2B:
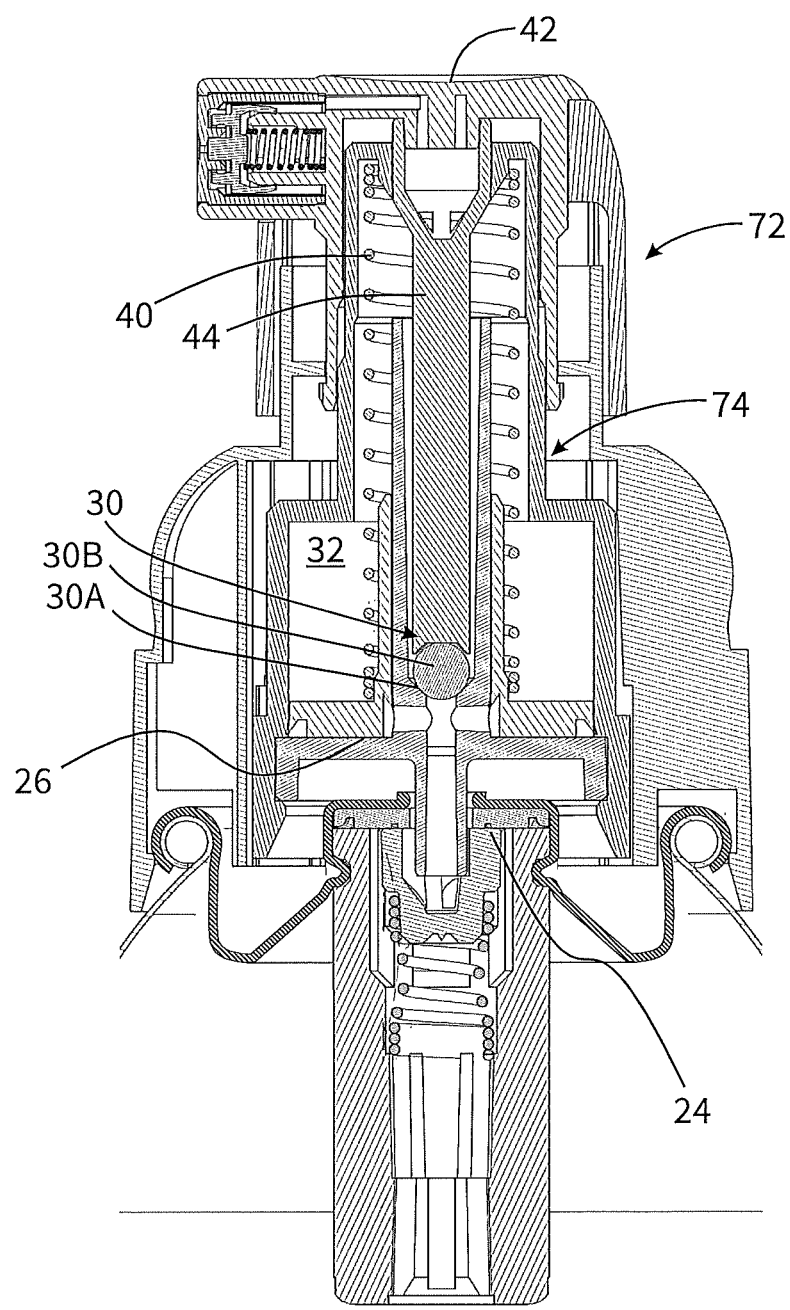

Proceeding from said initial position, the actuation handle 42 conjointly with the entire actuation unit 72 is depressed in the movement direction 2, on account of which a downward repositioning of the first control portion 44 to the same extent arises. FIG. 2B shows an intermediate state in which the actuation unit 72 is repositioned downward so far that a lower end side of the first control portion 44 has reached the spherical valve body 30B of the intermediate valve 30 and pushes said valve body 30B against a corresponding valve seat 30A of the chamber unit 74. The intermediate valve 30 is now closed.

Figure 2C:
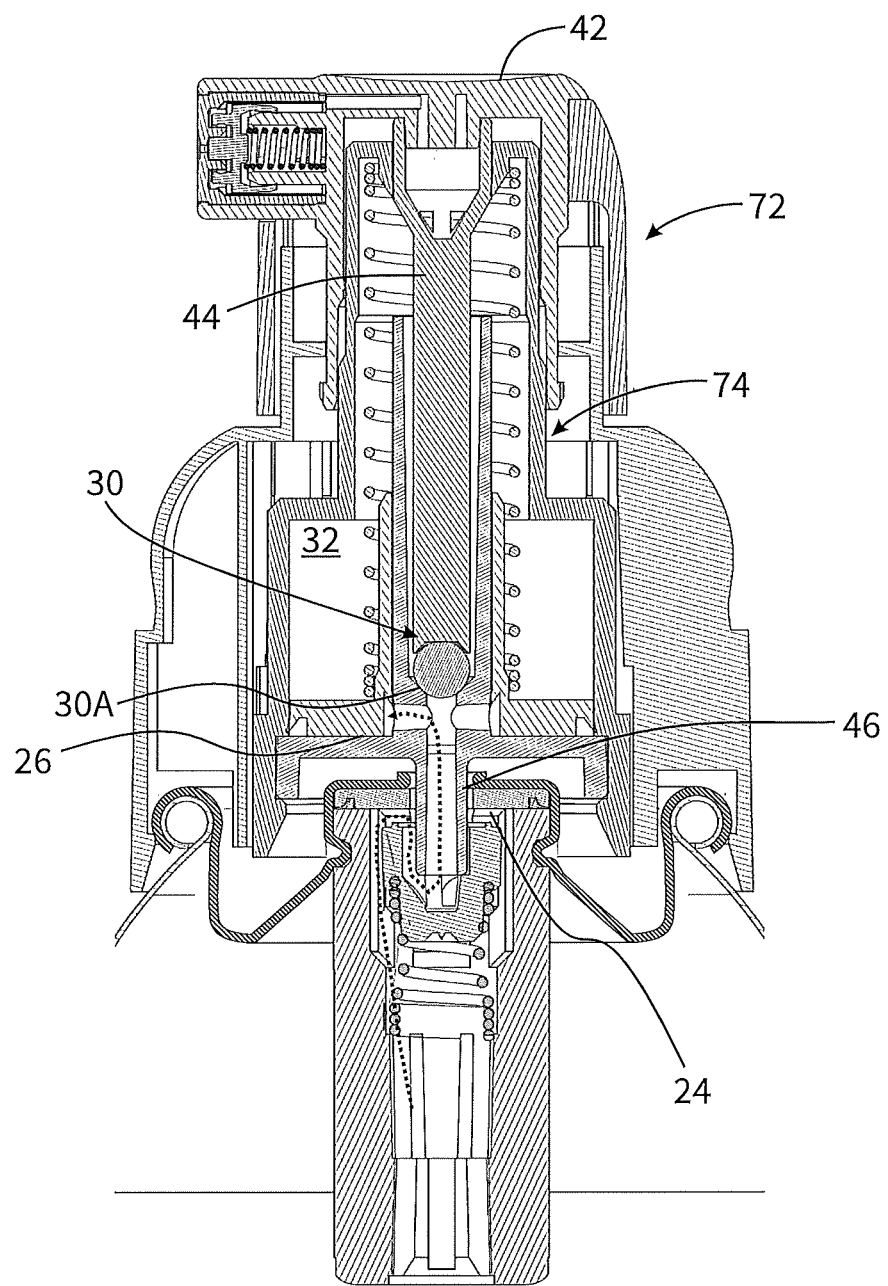

The continued depressing of the actuation unit 72 in the manner highlighted by FIG. 2C leads to the chamber unit 74 conjointly with the actuation unit 72 now being depressed as an entity by way of a force flux that runs through the valve body 30B. The second control portion 46 which acts on the infeed valve 24 and opens said valve counter to the force of the valve spring therein is also affected thereby. Liquid from the liquid reservoir 12, configured as a pressure reservoir, can now flow along the line (illustrated in a dotted manner in FIG. 2C) into the pre-metering chamber 26. An inflow into the main metering chamber 32 is not possible by virtue of the closed intermediate valve 30.

Figure 2D:
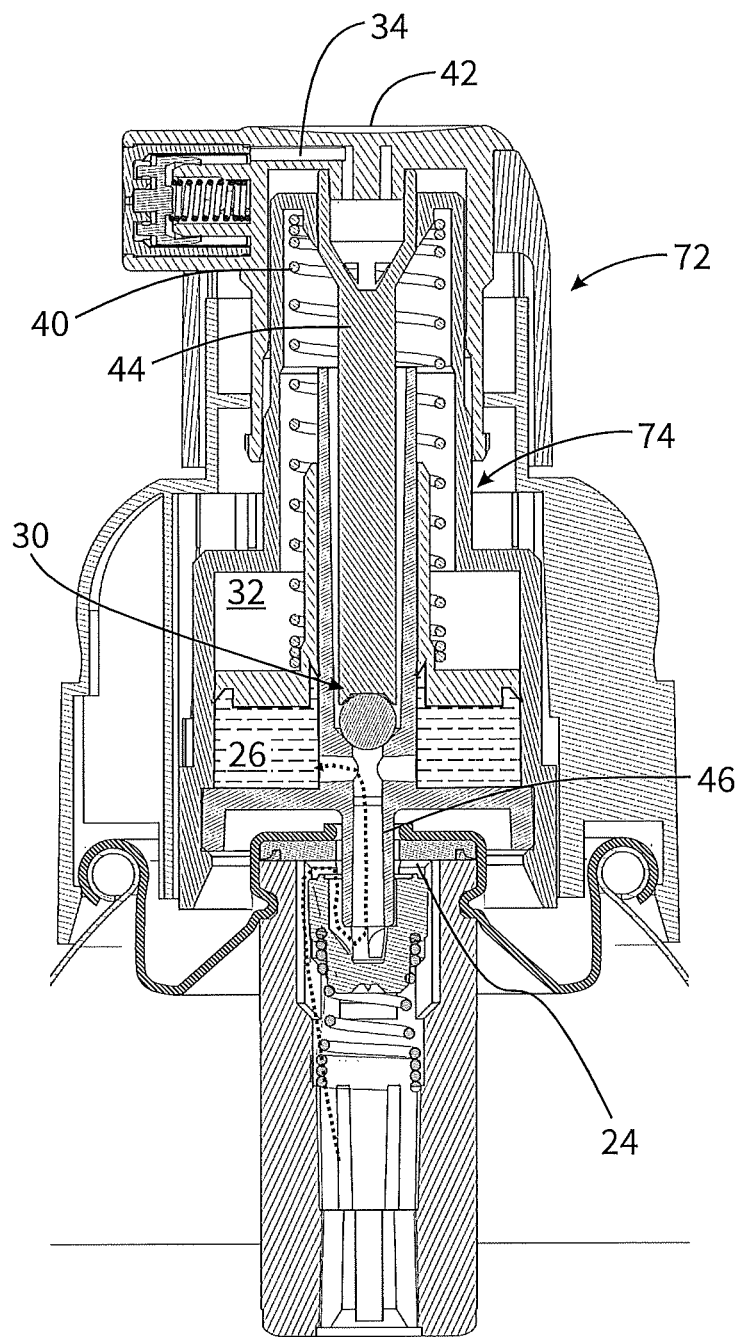

As is highlighted in FIG. 2D, the inflow of liquid into the pre-metering chamber 26 leads to the enlargement of the latter in that the wall unit 48 is repositioned upward counter to the force of the spring device 40. The main metering chamber 32 is simultaneously reduced in size to the same extent, such that the air located therein in the delivery state is compressed and, in the case of sufficient pressure, is squeezed out of the dispenser 10 through the discharge duct 34.

Figure 2E:
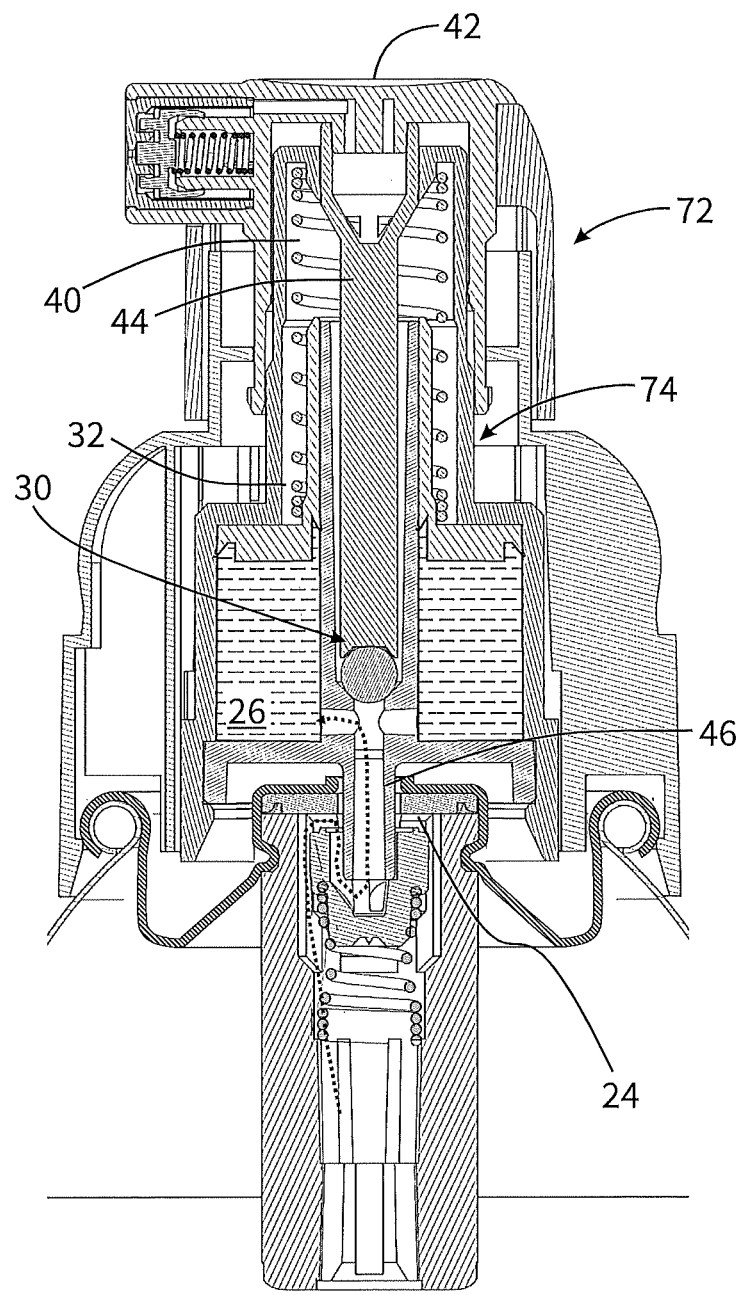

FIG. 2E shows the state in the case of a pre-metering chamber 26 enlarged to the maximum, and a main metering chamber 32 reduced in size to the minimum on account thereof. The inflow of liquid from the liquid reservoir 12 is terminated in this state.

Figure 2F:
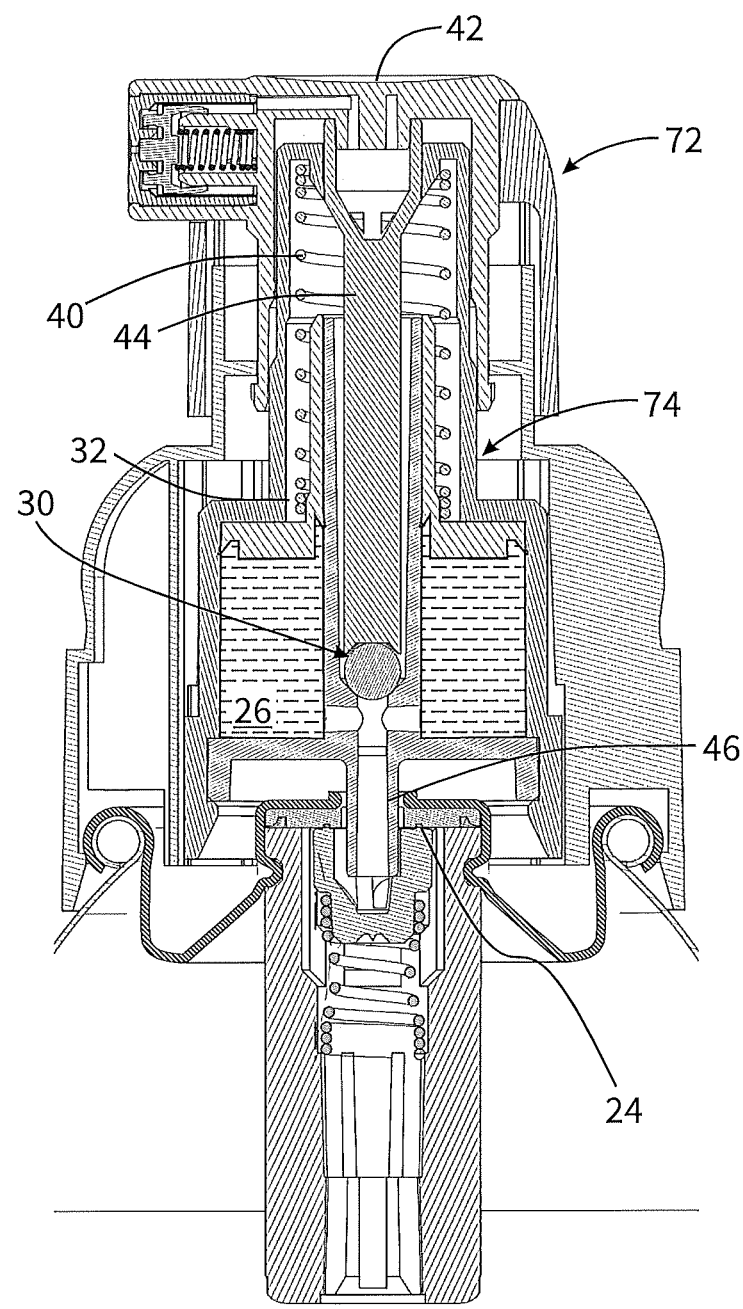
Figure 2G:
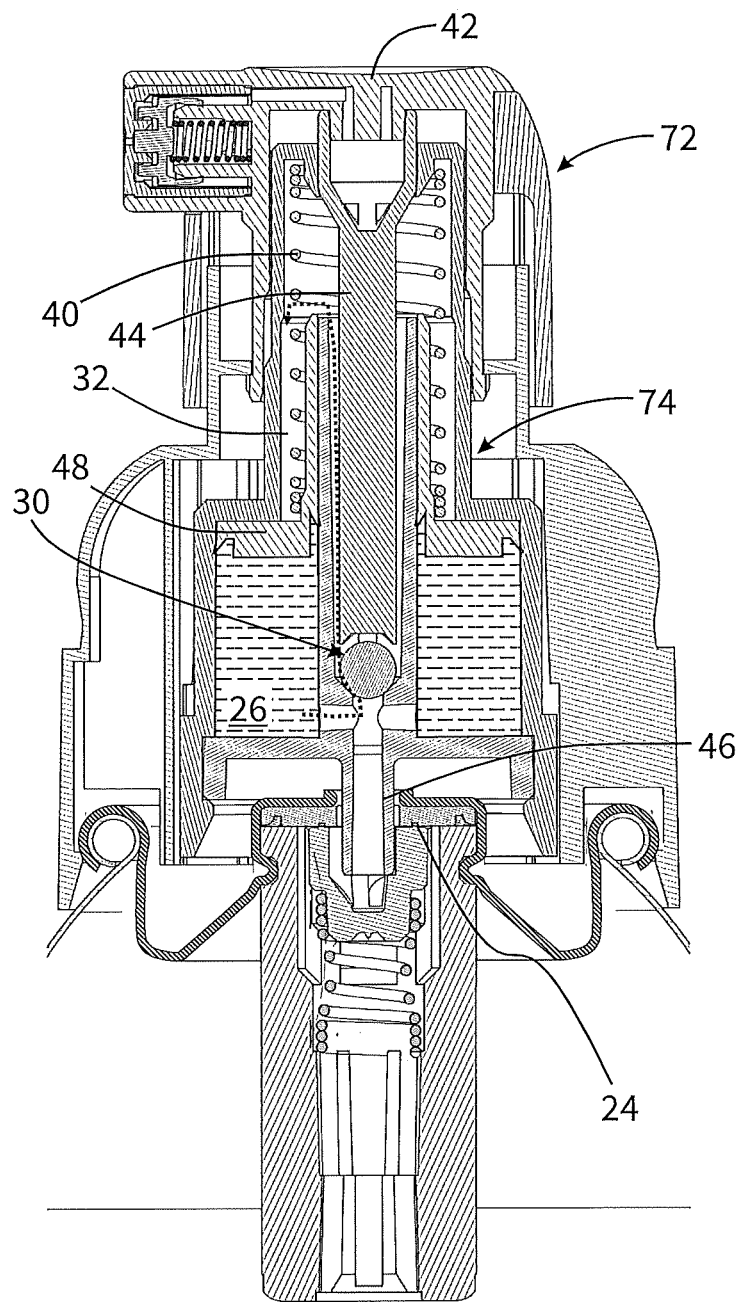
Figure 2H:
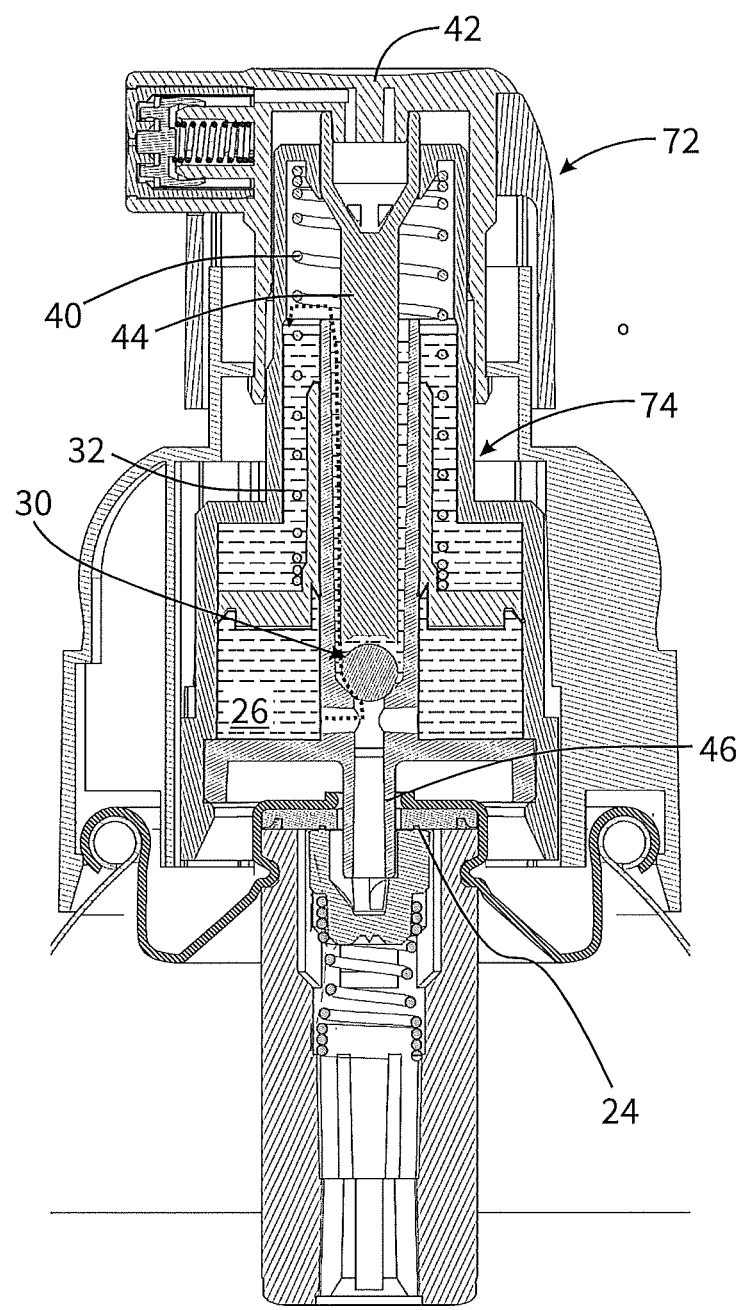

When the actuation handle 42 is now released, this leads to the infeed valve 24 being initially closed, according to the illustration of FIG. 2F, and the intermediate valve 30 being subsequently opened, according to FIG. 2G, since said intermediate valve 30 is no longer forced into the closed position thereof by the first control portion 44. Liquid can now flow along the path, illustrated in a dotted manner in FIG. 2G, from the pre-metering chamber 26 into the main metering chamber 32, this being performed under the effect of the spring device 40 which pushes the wall unit 48 downward.

Since the main metering chamber was still filled with air when the dispenser 10 was being put into operation, said air has first to be displaced prior to any actual discharge. No air escapes in the recirculation between the pre-metering chamber 26 and the main metering chamber 32, illustrated in FIGS. 2G and 2H, since the total volume of the pre-metering chamber 26 and the main metering chamber 32 is substantially unchanged in this phase. It is only when the sequence mentioned is carried out repeatedly, so as to proceed from the state of FIG. 2H, that air is conveyed to the outside through the discharge opening 38 in the phases of the enlargement of the pre-metering chamber 26 and of the reduction in size of the main metering chamber 32, until the main metering chamber 32 is ultimately completely filled with liquid and the dispenser is capable of being used according the intended use.

Figure 3A:
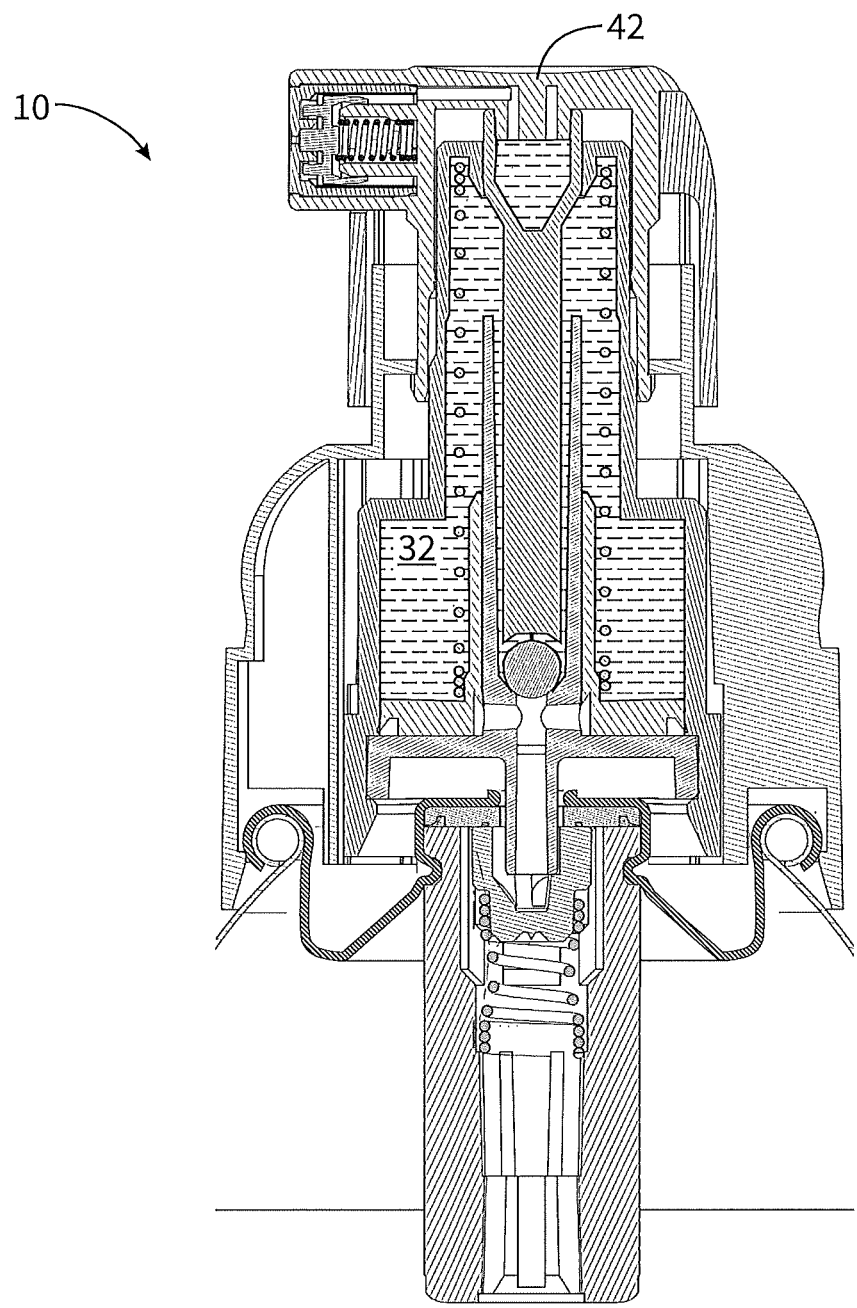
FIGS. 3A and 3B highlight the functioning of the dispenser after being put into operation.

FIG. 3A shows said state of the operationally ready dispenser 10 having a main metering chamber 32 that is completely filled with liquid. In operation, the movement sequence of the functional groups of the dispenser 10 described corresponds to that of the putting into operation according to FIGS. 2A to 2H.

Figure 3B:
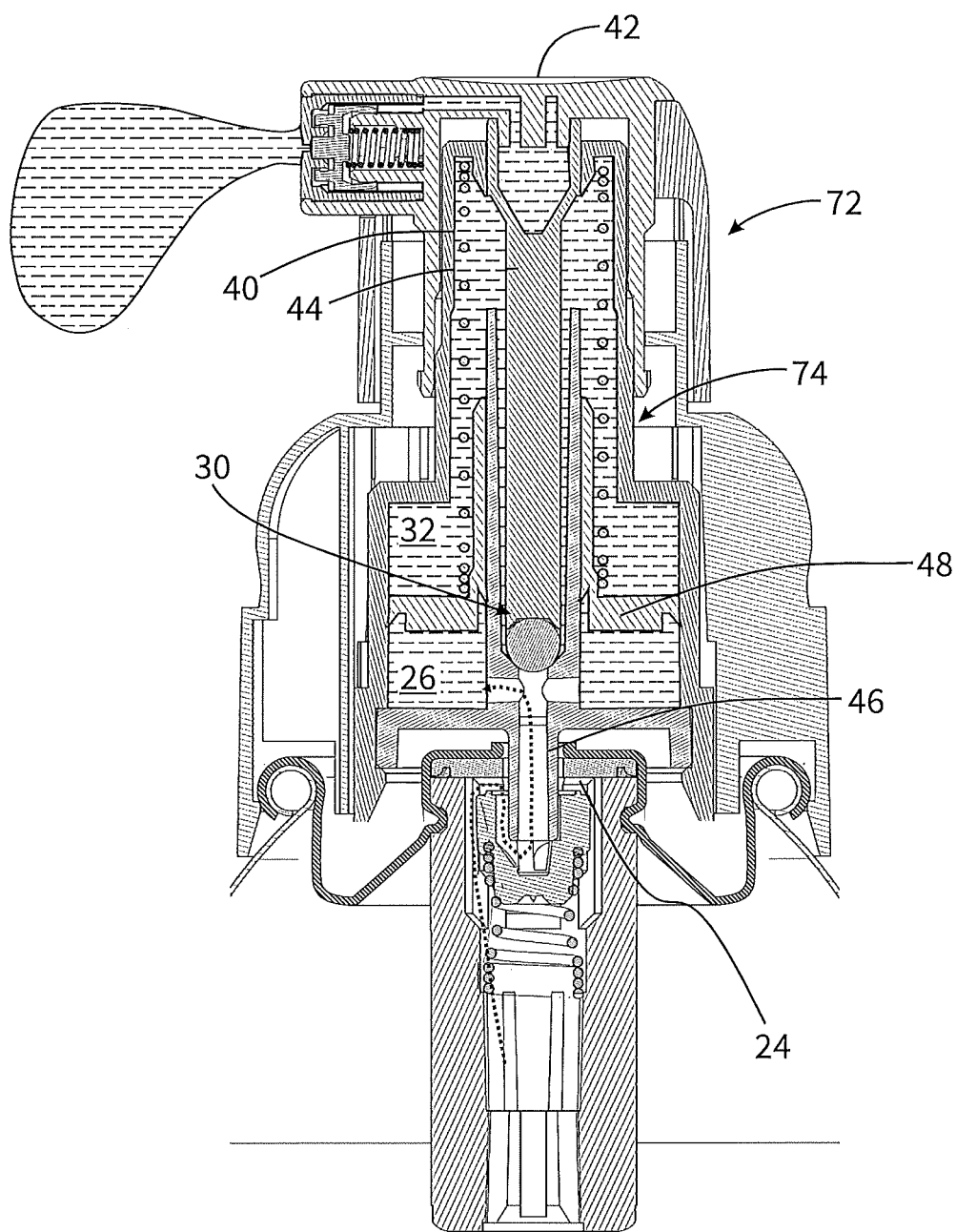

When the actuation handle 42, proceeding from the non-actuated operationally ready state of FIG. 3A, is depressed this in the manner highlighted by FIG. 3B leads to the intermediate valve 30 being closed according to FIG. 2D, and the infeed valve 24 being opened, this in turn effecting an inflow of liquid from the liquid reservoir 12 into the pre-metering chamber 26. On account thereof, an upward repositioning of the wall unit 48 is caused, wherein said wall repositioning in turn causes a volumetric reduction of the main metering chamber 32 and the discharge of liquid through the discharge duct 34 and the discharge opening 38.

As soon as the actuation handle 42 is released again after the discharge has been performed, the spring device 40 pushes the wall unit 48 downward again and thus displaces the liquid from the pre-metering chamber 26 into the main metering chamber 32 such that liquid can again be discharged by way of the subsequent next actuation.

Figure 4:
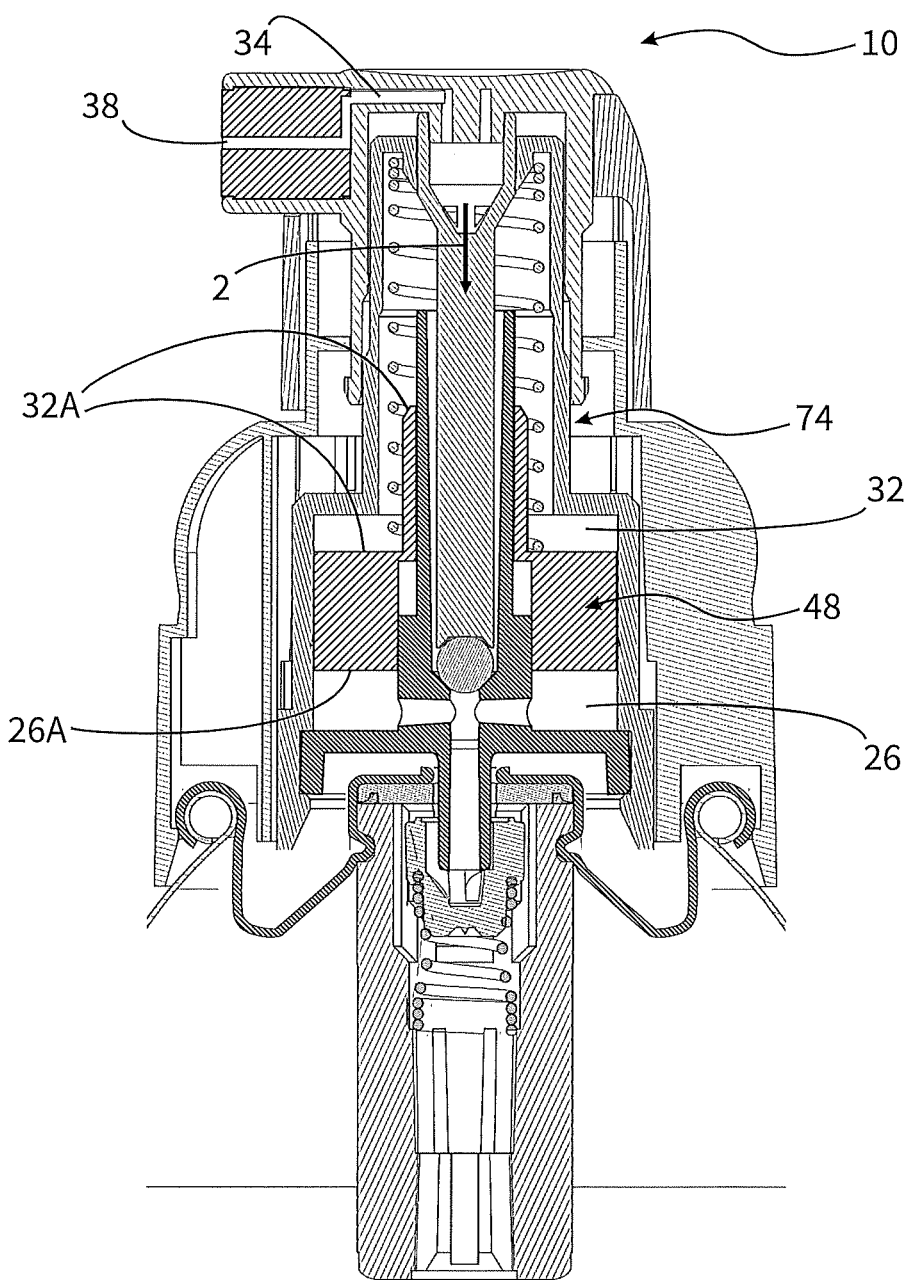
FIG. 4 shows an alternative design of the discharge head.

FIG. 4 shows a slightly modified alternative design. In as far as not explicitly illustrated in a different manner, the components in terms of function are identical to those of the design of FIGS. 2A to 3B. The wall unit 48 and a chamber unit 74 in the case of this alternative design are designed so as to be somewhat different such that the repositionable wall 26A, generating pressure with a view to the movement direction 2, of the pre-metering chamber 26 is smaller than the repositionable wall 32A, generating pressure with a view to the movement direction 2, of the main metering chamber 32. It is effected on account thereof that the volumetric enlargement of the main metering chamber 32 when recirculating liquid from the pre-metering chamber 26 into the main metering chamber 32 is larger than the volumetric reduction of the pre-metering chamber 26. This effects that liquid from the discharge duct 34 is suctioned back into the main metering chamber 32 during the recirculation, the risk of contamination of the liquid thus being reduced. In order for such a return suction to be facilitated, the design embodiment according to FIG. 4 does not have a discharge valve 36.

Figures 5A, 5B:
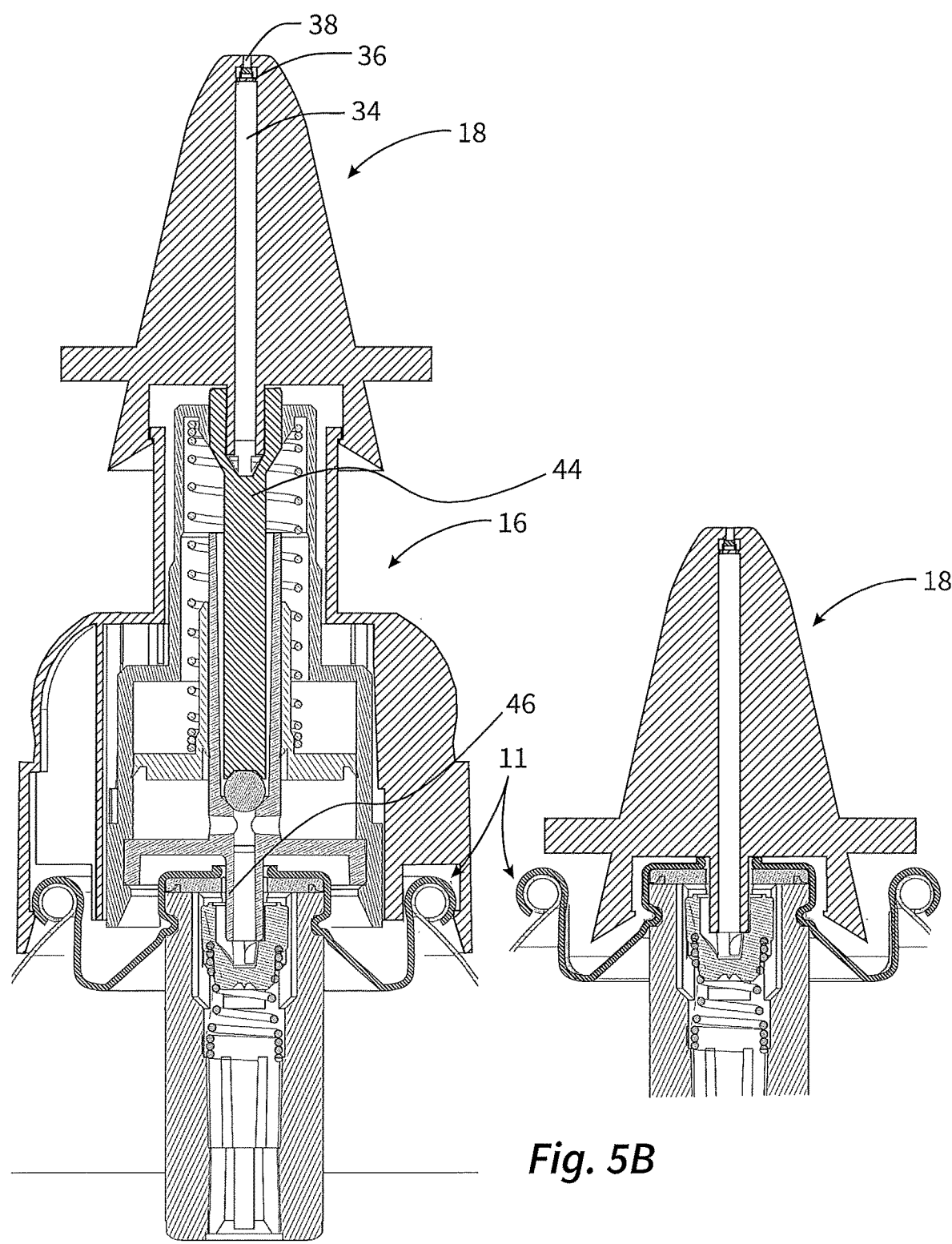
FIGS. 5A and 5B show a further potential design of the discharge head and the usability of the discharge unit of the latter without an adapter unit.

In the case of the design embodiment according to FIG. 5A the discharge unit 18 is designed differently than in the case of the preceding embodiments, since the discharge unit 18 here forms a nasal applicator. In the case of the design according to FIG. 5A it is moreover provided that the connecting dimension of the discharge unit 18 on the first control portion 44 is identical to the connecting dimension of the second control portion 46 and of the storage unit 11. The effect is that the adapter unit 16 can be omitted in a case-to-case manner. The discharge unit 18 designed with the nose applicator can also be coupled directly to the storage unit 11, as is highlighted in FIG. 5B.

With the exception of the aspects mentioned, the design embodiment of FIGS. 5A and 5B in terms of construction is identical to that of FIGS. 2A to 3B.

Figure 6:
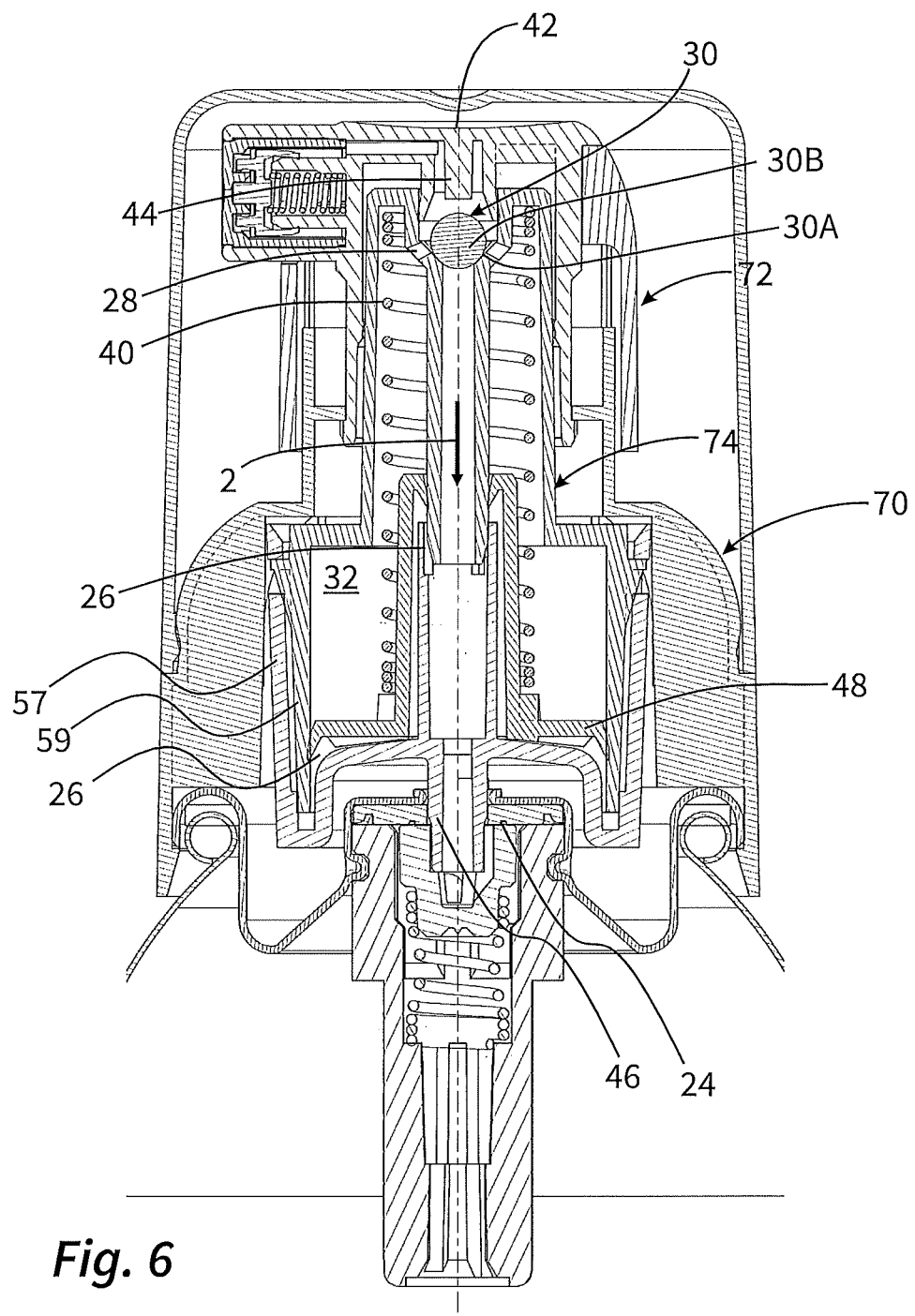
FIG. 6 shows a further alternative design of the discharge head.

The design according to FIG. 6 in normal operation operates in a manner corresponding to that of the preceding designs and is optimized in particular with a view to a facilitated ease of production. The substantial point of differentiation is the construction of the chamber unit 74 having two chamber components 57, 59 which both are in each case designed in a cup-type manner and in the region of cylindrical external walls are push-fitted in one another. A form-fitting latching connection is achieved in the overlapping region, wherein the latching cams have a shaping which is counter to a non-destructive axial separation of the chamber components 57, 59. A widening of the outer chamber component 57 and a resulting separation of the chamber components is prevented in that the basic unit 72 on the internal side prevents sufficient widening of the chamber component 57.

Figure 7:
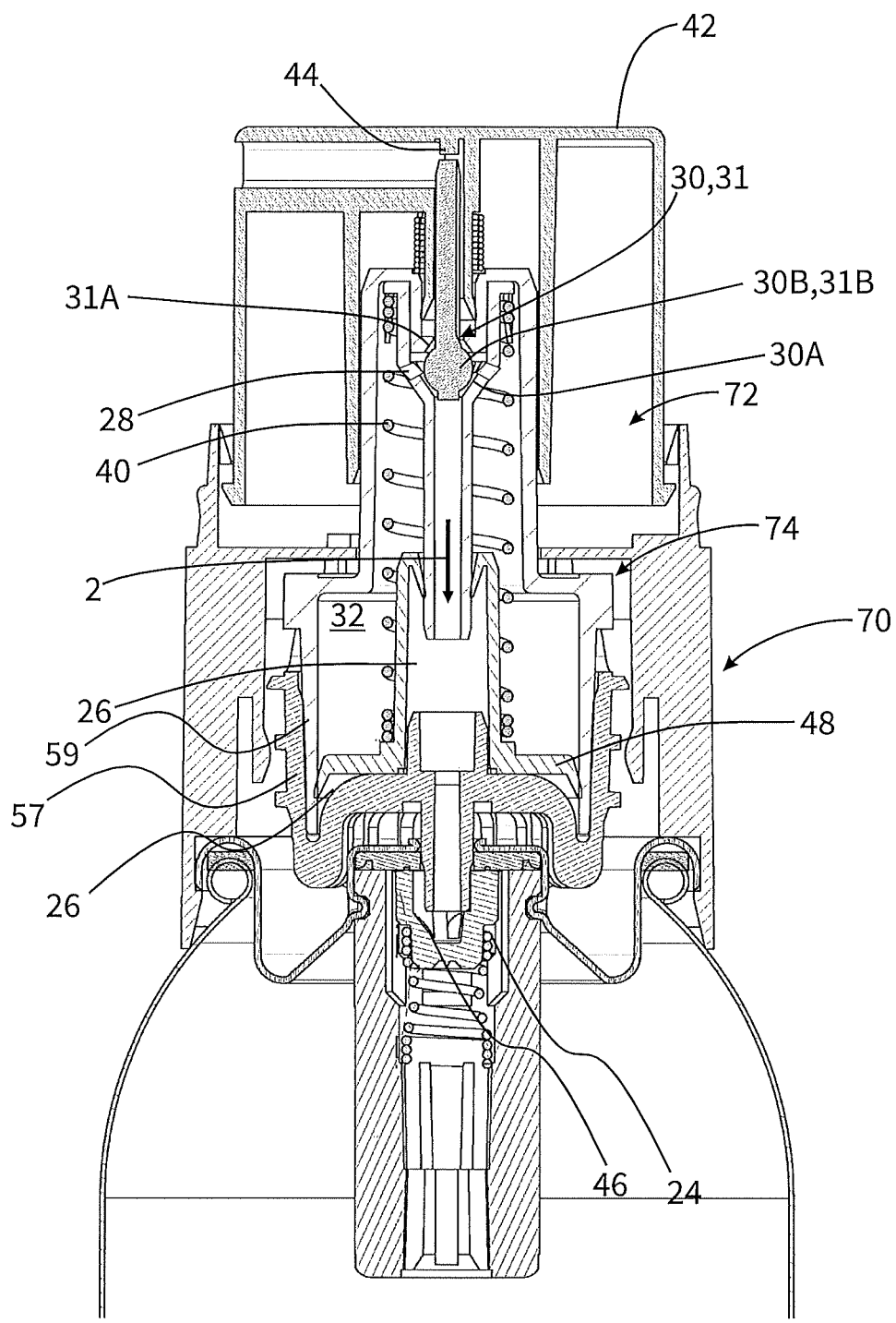
FIG. 7 shows a further alternative design of the discharge head, which differs from the design of FIG. 6 by way of a positively controlled outlet valve.

The design according to FIG. 7 in terms of function is largely identical to that of FIG. 6. Deviating from that design, the dispenser according to FIG. 7 however includes an outlet valve 31 which is provided for forcible openings and which is kept closed by positive pressure and the main chamber 32.

Said outlet valve 31 permits liquid to be stored under positive pressure in the main chamber 32 prior to being discharged. This is relevant, for example, in the case of liquid which according to the intended use is to form a foam when the pressure is relaxed. A minimum pressure has to be maintained in order for such a foam not to be created already in the main chamber 32.

The pressure of the liquid in the main chamber 32 in the resting state pushes a valve body 31B of the outlet valve 31 against a valve seat 31A. When actuated, the control portion 44 of the actuation handle 42 pushes against an appendage of the valve body 31B and thus pushes the valve body 31B away from the valve seat 31A such that the outlet valve is opened.

After the discharge has been performed, the liquid that flows under pressure into the main chamber 32 pushes the valve body 31B against the valve seat 31A again, and on account thereof closes the outlet valve 31 again until the next actuation.

In the case of the design of FIG. 7 a common valve body 30B, 31B which is the valve body of the intermediate valve 30 as well as of the outlet valve 31 is provided. Such a construction mode is advantageous since said construction mode reduces the number of required parts. In principle, however, a construction mode in which the two valves 30, 31 have in each case separate valve bodies 30B, 31B is also possible.

The invention claimed is:

1. A dispenser for discharging liquids, comprising:
a liquid reservoir for storing liquid prior to discharge;
a discharge opening through which liquid can be dispensed into an environment;
a metering device for discharging a defined liquid quantity as a reaction to an actuation of the dispenser, wherein the metering device at an entry side is connected to the liquid reservoir and at an exit side is connected to the discharge opening,
the metering device including:
a pre-metering chamber which by way of an infeed duct is connected to the liquid reservoir; and
a main metering chamber which by way of an intermediate duct is connected to the pre-metering chamber and by way of a discharge duct is connected to the discharge opening; and,
the pre-metering chamber and the main metering chamber having in each case one repositionable wall, the respective chamber volume being variable by the repositioning of said repositionable wall, and
the repositionable walls of the pre-metering chamber and of the main metering chamber being operatively coupled in such a manner that a volumetric enlargement of the pre-metering chamber causes a volumetric reduction of the main metering chamber;
an intermediate valve provided in the intermediate duct which in a closed state prevents, and in an opened state enables, inflow of liquid from the pre-metering chamber into the main metering chamber; and
an infeed valve provided in the infeed duct which in a closed state prevents, and in an opened state enables, inflow of liquid from the liquid reservoir into the pre-metering chamber.

2. The dispenser for discharging liquids according to claim 1,
further including a spring device by way of which the operatively coupled repositionable walls of the pre-metering chamber and of the main metering chamber are permanently impinged with a force in an effective direction of a volumetric reduction of the pre-metering chamber and a volumetric enlargement of the main metering chamber.

3. The dispenser for discharging liquids according to claim 1, further including
an actuation handle operatively connected to at least one of the infeed valve or the intermediate valve for controlling the infeed valve and/or the intermediate valve.

4. The dispenser for discharging liquids according to claim 3,
wherein the actuation handle acts mechanically on the infeed valve or the intermediate valve so that control of the respective valve is enabled irrespectively of a liquid pressure prevailing in the dispenser.

5. The dispenser for discharging liquids according to claim 1,
further including an actuation handle operatively connected to both the infeed valve and the intermediate valve for controlling the infeed valve and the intermediate valve,
wherein the operative connections between the actuation handle and the infeed valve and the actuation handle and the intermediate valve are specified such that the intermediate valve is closed and the infeed valve is opened by actuating the actuation handle.

6. The dispenser for discharging liquids according to claim 5,
wherein the operative connections between the actuation handle and the infeed valve and the actuation handle and the intermediate valve are specified such that the intermediate valve is initially closed by actuating the actuation handle, and the infeed valve is opened by the subsequent, continuing, actuation of the actuation handle.

7. The dispenser for discharging liquids according to claim 6,
wherein the intermediate valve has a valve seat and a valve body movable in relation thereto, wherein for controlling said valve body by the actuation handle the dispenser further includes a first control portion fixedly connected to the actuation handle and, the first control portion pressing the valve body against the valve seat when the actuation handle is actuated,
and a second control portion for actuating the infeed valve, said second control portion being disposed locationally fixed in relation to the valve seat of the intermediate valve such that, after closing of the intermediate valve, the second control portion for opening the infeed valve is repositionable by the actuation handle.

8. The dispenser for discharging liquids according to claim 1,
further including an outlet valve provided between the main metering chamber and the discharge opening, wherein positive pressure in the main metering chamber keeps the outlet valve in a closed state, and
the outlet valve can be forcibly opened by actuating the dispenser.

9. The dispenser for discharging liquids according to claim 1,
wherein the repositionable walls of the pre-metering chamber and of the main metering chamber are configured as displaceable walls which are mutually locationally fixed and form a common wall unit.

10. The dispenser for discharging liquids according to claim 9,
wherein the repositionable walls of the pre-metering chamber and of the main metering chamber are of identical size such that a volumetric reduction of the pre-metering chamber by repositioning the wall unit causes to the same extent a volumetric enlargement of the main metering chamber.

11. The dispenser for discharging liquids according to claim 9, wherein:
the repositionable wall of the pre-metering chamber is smaller than the repositionable wall of the main metering chamber such that a volumetric reduction of the pre-metering chamber by repositioning the wall unit causes to a greater extent a volumetric enlargement of the main metering chamber; or
the repositionable wall of the pre-metering chamber is larger than the repositionable wall of the main metering chamber such that a volumetric reduction of the pre-metering chamber by repositioning the wall unit causes to a lesser extent a volumetric enlargement of the main metering chamber.

12. The dispenser for discharging liquids according to claim 1, wherein:
the liquid reservoir includes a pressure reservoir configured for storing liquids at a positive pressure; or
the dispenser includes a pressure-impingement device by which liquid from the liquid reservoir, for the purpose of feeding into the pre-metering chamber, is capable of being impinged with pressure.

13. The dispenser for discharging liquids according to claim 1 further including:
a storage unit which comprises the liquid reservoir; and
a discharge head and a fastening device, the discharge head being fastened to the storage unit by the fastening device, the discharge head comprising the pre-metering chamber, the main metering chamber, and the discharge opening.

14. The dispenser for discharging liquids according to claim 13, wherein:
the discharge head has an adapter unit and a discharge unit;
the adapter unit includes the fastening device;
the discharge unit has the discharge opening; and
the adapter unit and the discharge unit are connected to one another by a force-fitting plug connection.

15. The dispenser for discharging liquids according to claim 13,
wherein the pre-metering chamber and/or the main metering chamber are delimited by two chamber components connected to one another in an axial direction,
the chamber components each comprising an outer cylindrical portion, the outer cylindrical portions being push-fitted into one another in an overlapping manner.

16. The dispenser for discharging liquids according to claim 13, wherein:
the discharge head includes a basic housing which by the fastening device is connected in a locationally fixed manner to the liquid reservoir;
the discharge head includes an actuation unit movable in a linear manner in relation to the basic housing and which comprises an actuation handle; and
the discharge head includes a chamber unit movable in a linear manner in relation to the basic housing and the actuation unit, the chamber unit forming an external wall of the pre-metering chamber and/or of the main metering chamber.

17. The dispenser for discharging liquids according to claim 1,
further including a discharge valve in the discharge duct, the discharge valve opening as a function of pressure of liquid flowing in from the main metering chamber.

18. The dispenser for discharging liquids according to claim 1, having at least one of the following features:
the liquid reservoir is filled with a liquid comprising one of the following:
a foodstuff liquid, a technical liquid, or a cosmetic liquid; and/or
the liquid reservoir has a volume of up to 1000 ml; and/or
a discharge volume of the metering device is determined by the repositioning capability of the repositionable wall of the main metering chamber and is between 0.01 ml and 5 ml; and/or
the intermediate valve comprises a valve body and a valve seat, the valve body being movable in a valve chamber, the valve seat being provided on an entry side in the valve chamber, and the valve chamber is reducible in size by an actuation handle; and/or
the repositionable walls are repositionable in an actuation direction of the dispenser.

19. An operating method for the dispenser for discharging liquids according to claim 1, said operating method comprising the following steps:
opening the infeed valve between the liquid reservoir and the pre-metering chamber;
filling the pre-metering chamber by way of the infeed duct with pressurized liquid from the liquid reservoir, said pre-metering chamber, on account of a pressure-related repositioning of the repositionable wall of the pre-metering chamber, assuming a maximum volume of said pre-metering chamber, and the main metering chamber, on account of the repositioning of the repositionable wall of the main metering chamber caused by the repositioning of the repositionable wall of the pre-metering chamber, assumes a minimum volume of said main metering chamber;
conveying the liquid from the pre-metering chamber while repositioning the repositionable wall thereof through the intermediate duct into the main metering chamber until the main metering chamber assumes a maximum volume thereof and the pre-metering chamber assumes a minimum volume thereof; and
in the course of a renewed filling of the pre-metering chamber by the infeed duct with pressurized liquid from the liquid reservoir, repositioning yet again the repositionable walls of the pre-metering chamber and of the main metering chamber such that the volume of the main metering chamber is reduced and the liquid from the main metering chamber is discharged through the discharge opening.

20. The dispenser for discharging liquids according to claim 8, wherein the outlet valve has a valve body and a valve seat, the valve body in a closed state bearing on the valve seat and by repositioning an actuation handle the valve body is mechanically pushed away from the valve seat.

21. The dispenser for discharging liquids according to claim 8, wherein the outlet valve and the intermediate valve have a common valve body movable between two terminal positions, wherein each of the terminal positions corresponds to one valve seat.

22. The dispenser for discharging liquids according to claim 13, wherein the pre-metering chamber and/or the main metering chamber are delimited by two chamber components connected to one another in an axial direction, and at least one of the chamber components comprises an outer cylindrical portion surrounded by a basic housing of the discharge head such that a widening of the outer cylindrical portion is delimited so as to counteract separation of the chamber components.

23. A dispenser for discharging a liquid, said dispenser comprising:
   a liquid reservoir configured for storing liquid prior to discharge from said dispenser;
   a discharge opening through which liquid is discharged into an environment of said dispenser;
   a metering device for discharging a defined quantity of liquid during actuation of said dispenser, said metering device having an entry side in fluid communication with said liquid reservoir and an exit side in fluid communication with said discharge opening, said metering device comprising:
      a pre-metering chamber;
      an infeed duct fluidly interconnecting said pre-metering chamber and said liquid reservoir;
      a main metering chamber;
      an intermediate duct fluidly interconnecting said main metering chamber and said pre-metering chamber; and
      a discharge duct fluidly interconnecting said main metering chamber and said discharge opening;
   a wall arrangement, said wall arrangement comprising a first wall disposed adjacent said main metering chamber and repositionable to vary a chamber volume thereof, and a second wall disposed adjacent said pre-metering chamber and repositionable to vary a chamber volume thereof, said first and second walls being operatively connected to one another such that a volumetric enlargement of the chamber volume of said pre-metering chamber causes a volumetric reduction of the chamber volume of said main metering chamber; and
   an infeed valve having a closed state in which said infeed valve prevents, and an open state in which said infeed valve enables, inflow of liquid from said liquid reservoir into said pre-metering chamber.

24. The dispenser according to claim 23, further including an intermediate valve disposed in said intermediate duct, said intermediate valve having a closed state in which said intermediate valve prevents, and an opened state in which said intermediate valve enables, inflow of liquid from said pre-metering chamber and into said main metering chamber.

* * * * *